US005930690A

United States Patent [19]

Nakata

[11] Patent Number: 5,930,690

[45] Date of Patent: Jul. 27, 1999

[54] FM MULTIPLEX BROADCASTING WAVE RECEIVER

[75] Inventor: Hiroyuki Nakata, Ome, Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,592

[22] Filed: Jan. 31, 1996

[30] Foreign Application Priority Data

Feb. 8, 1995 [JP] Japan .................................... 7-043458

[51] Int. Cl.[6] ........................................................ H04B 1/18

[52] U.S. Cl. .................................... 455/186.1; 455/186.2; 455/94; 455/95

[58] Field of Search ............................. 455/186.1, 186.2, 455/95, 33.1, 94, 33.2

[56] References Cited

U.S. PATENT DOCUMENTS

| | | | |
|---|---|---|---|
| 5,020,143 | 5/1991 | Duckeck et al. | 455/186.1 |
| 5,063,610 | 11/1991 | Alwadish . | |
| 5,134,719 | 7/1992 | Mankovitz . | |
| 5,214,792 | 5/1993 | Alwadish | 455/186.1 |
| 5,491,838 | 2/1996 | Takahisa et al. | 455/66 |
| 5,493,709 | 2/1996 | Duckeck et al. | 455/185.1 |
| 5,507,021 | 4/1996 | Siegle | 455/186.2 |
| 5,572,194 | 11/1996 | Shiota | 455/186.1 |
| 5,572,201 | 11/1996 | Graham et al. | 455/45 |
| 5,584,051 | 12/1996 | Goken | 455/186.2 |
| 5,603,108 | 2/1997 | Thoone | 455/186.1 |

FOREIGN PATENT DOCUMENTS

| | | |
|---|---|---|
| 0352913 A2 | 1/1990 | European Pat. Off. . |
| 0626637 A1 | 11/1994 | European Pat. Off. . |

*Primary Examiner*—Tommy P. Chin
*Assistant Examiner*—Anand S. Rao
*Attorney, Agent, or Firm*—Frishauf, Holtz, Goodman, Langer & Chick

[57] ABSTRACT

Upon receiving an FM multiplex broadcasting wave carrying audible information and supplemental visible information, an FM radio receiver equipped with a display unit audibly outputs the audible information and displays the supplemental visible information on the display unit. When the FM radio receiver receives the supplemental visible information while the receiver is not in a reproduction mode, the received supplemental visible information is stored in a reproduction buffer. When the FM radio receiver is set to the reproduction mode, the supplemental visible information stored in the reproduction buffer is displayed on the display unit.

10 Claims, 8 Drawing Sheets

FM MULTIPLEX BROADCASTING WAVE RECEIVER

BACKGROUND OF THE INVENTION

1. Field of the Invention

The present invention relates to an FM multiplex broadcasting wave receiver for receiving an FM broadcasting wave carrying audio information and display information multiplexed thereon and for audibly outputting audio information and visually outputting the display information.

2. Description of the Prior Art

Services for of supplying service information such as character information by means of frequency modulation (FM) multiplex broadcasting electric waves are now available, and the supplied service information is displayed on a display device at receiving sides. This service is a so called FM multiplex broadcasting service, and visual information radio receivers are used in daily life by consumers to enjoy such character information as well as radio broadcasting programs.

More specifically, an FM broadcasting station (the service supplying side) sends a multiplex broadcasting electric wave carrying display information such as character or letter and digital information, and consumers (the receiving sides) receive such broadcasting electric waves with an FM receiver equipped with a liquid crystal display device. The FM receiver separates the display information (character or letter and digital informations) from audio information carried by the FM broadcasting electric waves, and converts the separated display information into character codes to display same on the liquid crystal display device. Then, the consumer can read the display information on the liquid crystal display unit of his (her) FM receiver. The FM multiplex broadcasting service supplies display services (visual information) including supplemental program information and independent program information. The supplemental program information includes information relating to a program on the air, for example, such as a title of music on the air and a name of a person who requests such music. The independent program information includes information such as traffic information and weather forecasts, which do not relate to the audio program on the air. The consumer can select the supplemental program information or the independent program information by setting his (her) FM radio receiver.

When a conventional FM radio receiver is set to display the display information, at least one of the independent program information or the supplemental program information is displayed on the display device. Therefore, when a listener sets his (her) FM radio receiver to display an independent program information while he (she) is listening to an audio program, he (she) can not read supplemental program information relating to the audio program to which he (she) is then listening even though such supplemental program information is available. It would be natural for the listener to want to read the supplemental program information to know instantly the title of the music that (she) is then listening to. However, since the supplemental program information is different in its nature from the independent program information, there will be less possibility for the same contents of the supplemental program information to be repeatedly transmitted, and the contents of the supplemental program information will change successively along with the audio program. Therefore, with the conventional FM radio receiver, the listener can miss the chance to read his (her) desired supplemental program information.

SUMMARY OF THE INVENTION

The present invention has been made to overcome the above mentioned inconvenience of the conventional FM radio receiver, and has an object to provide an FM multiplex broadcasting wave receiver, which will allow a listener to read supplemental program information without failure.

According to one aspect of the present invention, there is provided an FM multiplex broadcasting wave receiver, which receives a frequency modulated multiplex broadcasting wave carrying audible information and visible information multiplexed thereon, and which comprises:

- receiving means for detecting the audible information and a supplemental visible information contained in the visible information from the received frequency modulated multiplex broadcasting wave, contents of the supplemental visible information relating to the audible information;
- output means for audibly outputting the audible information detected by said receiving means;
- displaying means for displaying the supplemental visible information detected by said receiving means;
- first memory having a predetermined memory area for storing the supplemental visible information detected by said receiving means;
- display instructing means for instructing said displaying means to display a supplemental visible information thereon;
- memory control means for, when a supplemental visible information is detected by said receiving means while said display instructing means does not instruct said displaying means to display a supplemental visible information thereon, storing in said first memory said supplemental visible information detected by said receiving means; and
- display control means for controlling said displaying means to display the supplemental visible information stored in said first memory, when said display instruction means instructs said displaying means to display a supplemental visible information.

With the FM multiplex broadcasting wave receiver having the above structure, a user can read the supplemental information relating to the audible information without failure.

It should be apparent to those skilled in the art from the following description of a preferred embodiment that the present invention may be modified in various manners and may be applicable to other apparatuses.

BRIEF DESCRIPTION OF THE DRAWINGS

Other objects and structures of the present invention will be more fully understood from the description, when taken in conjunction with the accompanying drawings, in which.

DETAILED DESCRIPTION OF THE PREFERRED EMBODIMENTS

Figure 1:
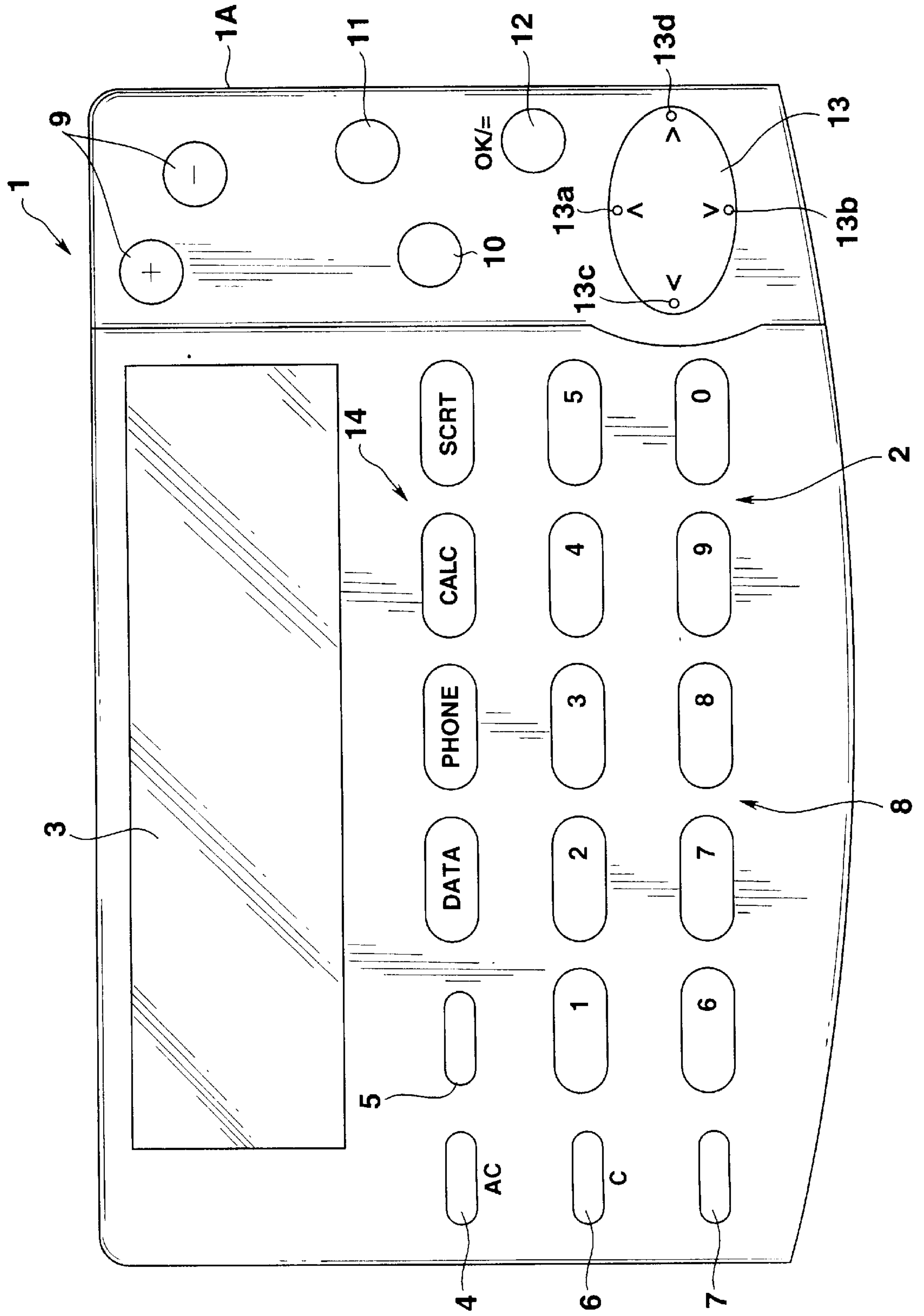
FIG. 1 is an external plane view of an FM multiplex broadcasting wave receiver according to an embodiment of the present invention.

Now, a preferred embodiment of the present invention will be described with reference to the accompanying drawings. An FM multiplex broadcasting wave receiver 1 according to the present invention is provided with an input key unit 2 and a display unit 3 on a front surface of a casing 1A thereof, as shown in FIG. 1. The display unit 3 displays independent display information and supplemental display information, as will be described later in more detail. The display unit 3 comprises a liquid crystal display device, and has a display area for displaying two lines of a predetermined number of characters each having a predetermined size. The input key unit 2 comprises a delete key 4, a function key 5, an alphabet/numeral selection key 6, a pictograph key 7, alphabet/numeral keys 8 for entering alphabets "A" to "Z" and numerals "1" to "0", tuning keys 9 for tuning in to a desired broadcasting service, a data memory key 10, a data menu key 11, an OK key 12, a cursor key 13, and mode keys 14 including a data bank key, a phone key, a calculation key and a secret key. The cursor key 13 is a combination key including an up key 13*a*, a down key 13*b*, a Left key 13*c* and a Right key 13*d*, which are integrally combined into a single unit.

Figure 2:
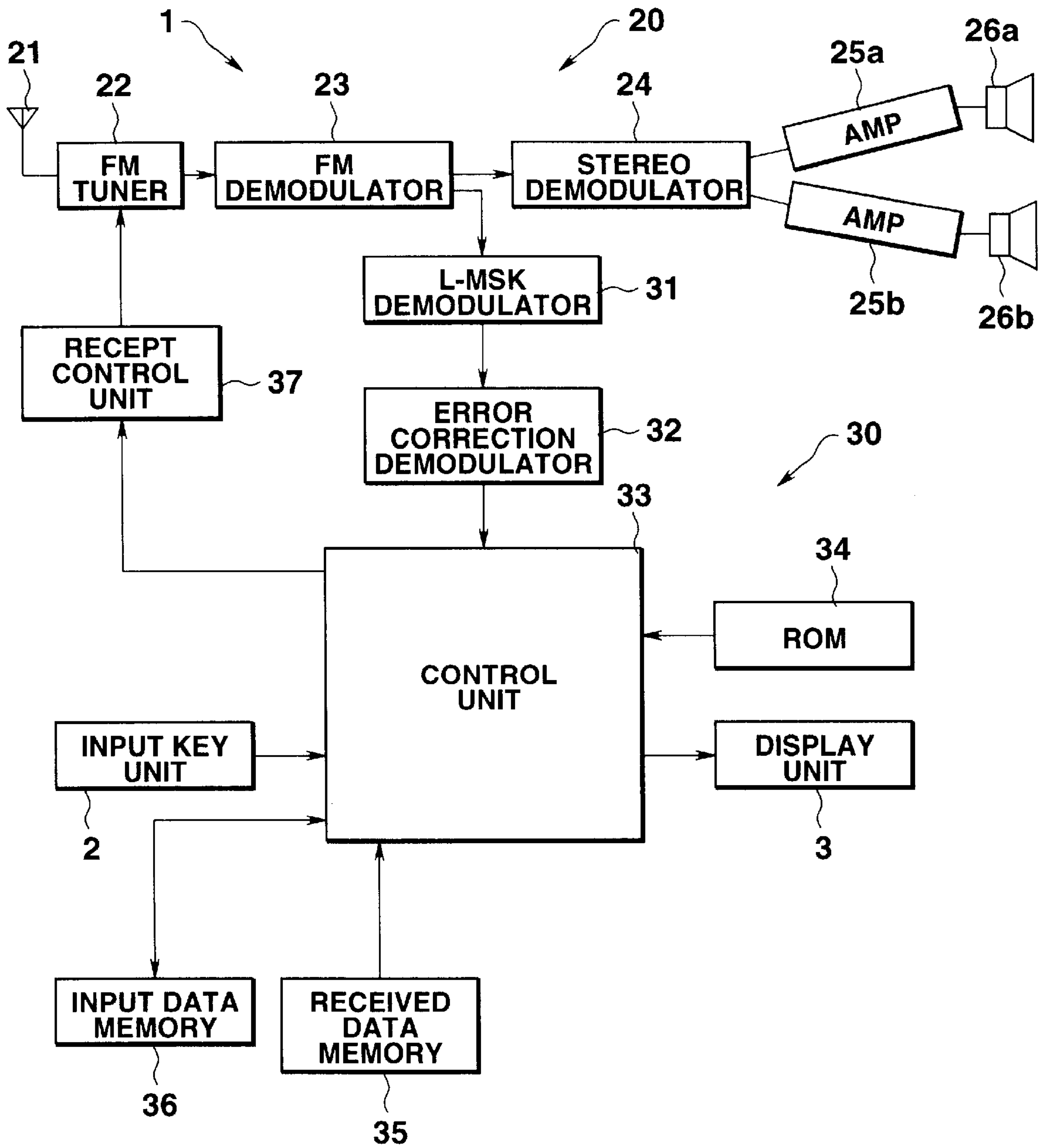
FIG. 2 is a circuit diagram of the FM multiplex broadcasting wave receiver.

FIG. 2 is a block diagram of the FM multiplex broadcasting receiver 1 of the present invention, which comprises an FM broadcasting receiving unit 20 for receiving an FM broadcasting wave to reproducing broadcasting sounds and a display information receiving unit 30 for processing the received FM broadcasting wave to detect display information multiplexed in the received wave.

The FM broadcasting receiving unit 20 comprises an antenna 21 for receiving the FM broadcasting wave, an FM tuner 22 for tuning in to the FM broadcasting wave, an FM demodulator 23 for demodulating an FM broadcasting signal, a stereo demodulator 24 for processing the demodulated FM broadcasting signal to obtain stereo signals (a left signal or an L signal and a right signal or an R signal), a pair of amplifiers 25*a*, 25*b* for amplifying the stereo signals, and a pair of speakers 26*a*, 26*b* for audibly outputting stereo sounds.

The display information receiving unit 30 is connected to the FM demodulator 23 of the FM broadcasting receiving unit 20, and comprises a Level Controlled Minimum Shift Keying (L-MSK) demodulator 31, an error correction demodulator 32 and a control unit 33. The demodulator 31 discriminates a display or visible information multiplexed on a digital-modulated FM broadcasting signal, which is frequency modulated such that a level of the signal changes to 4 to 10% of degree of modulation for L and R signals included in the FM broadcasting signal. The control unit 33 executes various processes on the discriminated display or visible information.

The control unit 33 is connected with a read only memory (ROM) 34 for storing a process program of the control unit 33, the input key unit 2, the display unit 3, a received data memory 35 for storing display information, an input data memory 36 for storing data inputted by the input key unit 2, and a receipt control unit 37 for controlling the tuning operation of the FM tuner 22 in response to operation of the tuning key 9 of the input key unit 2. Further, the control unit 33 works in accordance with the process program stored in the ROM 34 to control the display on the display unit 3.

Figure 3:
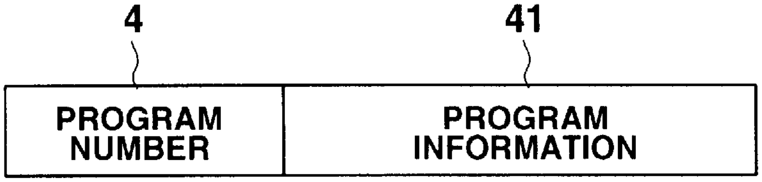
FIG. 3 is a view showing a format of a received information.

FIG. 3 is a view showing a received information format of the display information, which includes a program number 40 and program information 41. The program number 40 indicates whether the program information is supplemental information or independent information, i.e. the program number 40 takes "254", when the program information is the supplemental program (supplemental display information), and takes another value, i.e., one of values "001" to "253", when the program information is the independent program (independent display information). The program information is letter or character data representative of contents of the display information.

Figure 6:
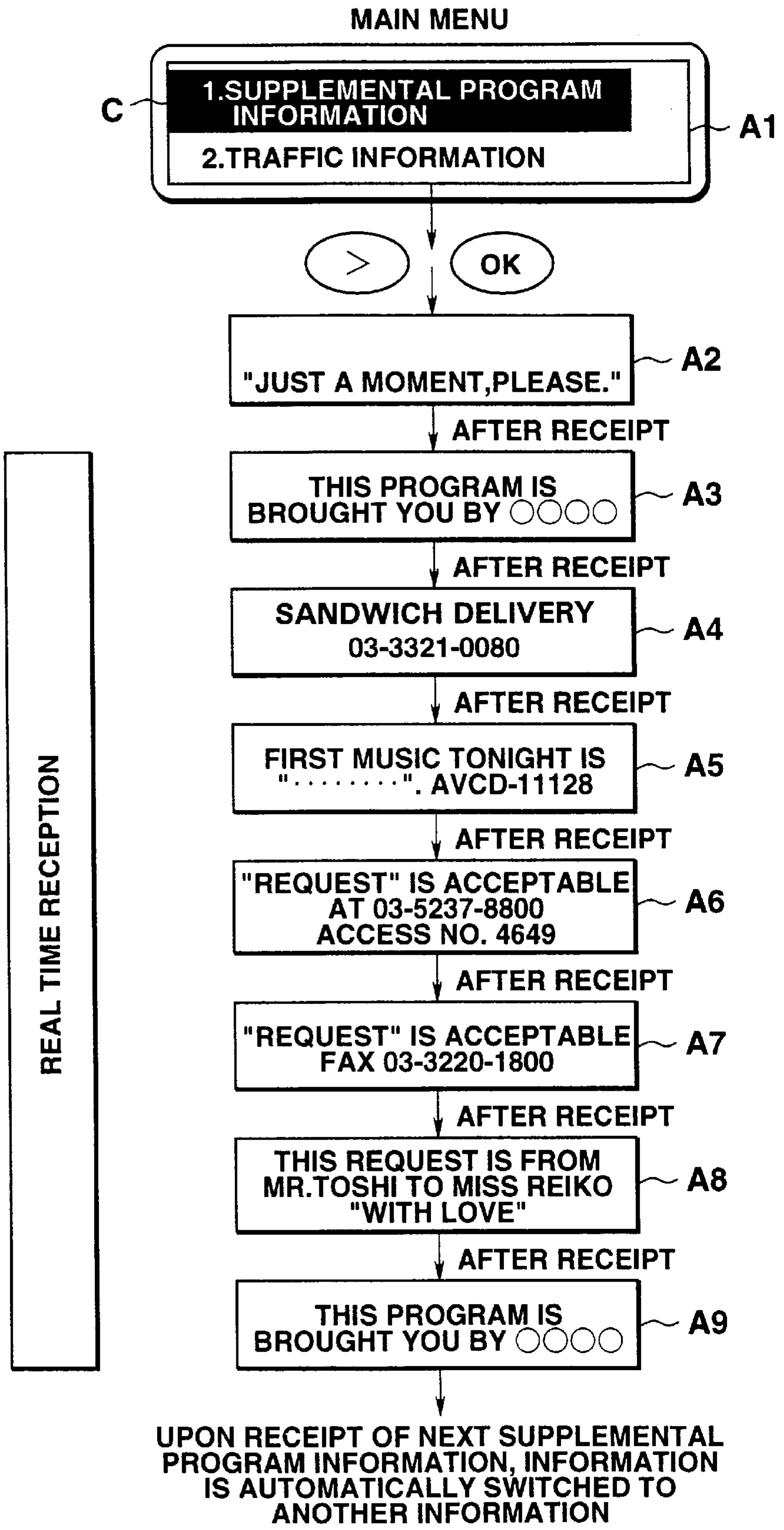
FIG. 6 is a view showing transitive displays displayed on a display unit.

As shown by way of example in FIG. 6, the contents of the supplemental program relate to an audio program reproduced by the FM broadcasting receiving unit 20. The supplemental program includes a sponsor of the audio program (A3 and A9), a commercial message (A4), a title of music (A5), a phone number and an access number (A6) for program requests, a facsimile number for program requests (A7), a name of a person who makes a request and his (her) message. The contents of the independent program do not relate to the audio program to be reproduced by the FM broadcasting receiving unit 20. The independent program includes traffic information, weather forecasts, stock market information, foreign currency exchange information, and the like.

Figure 4:
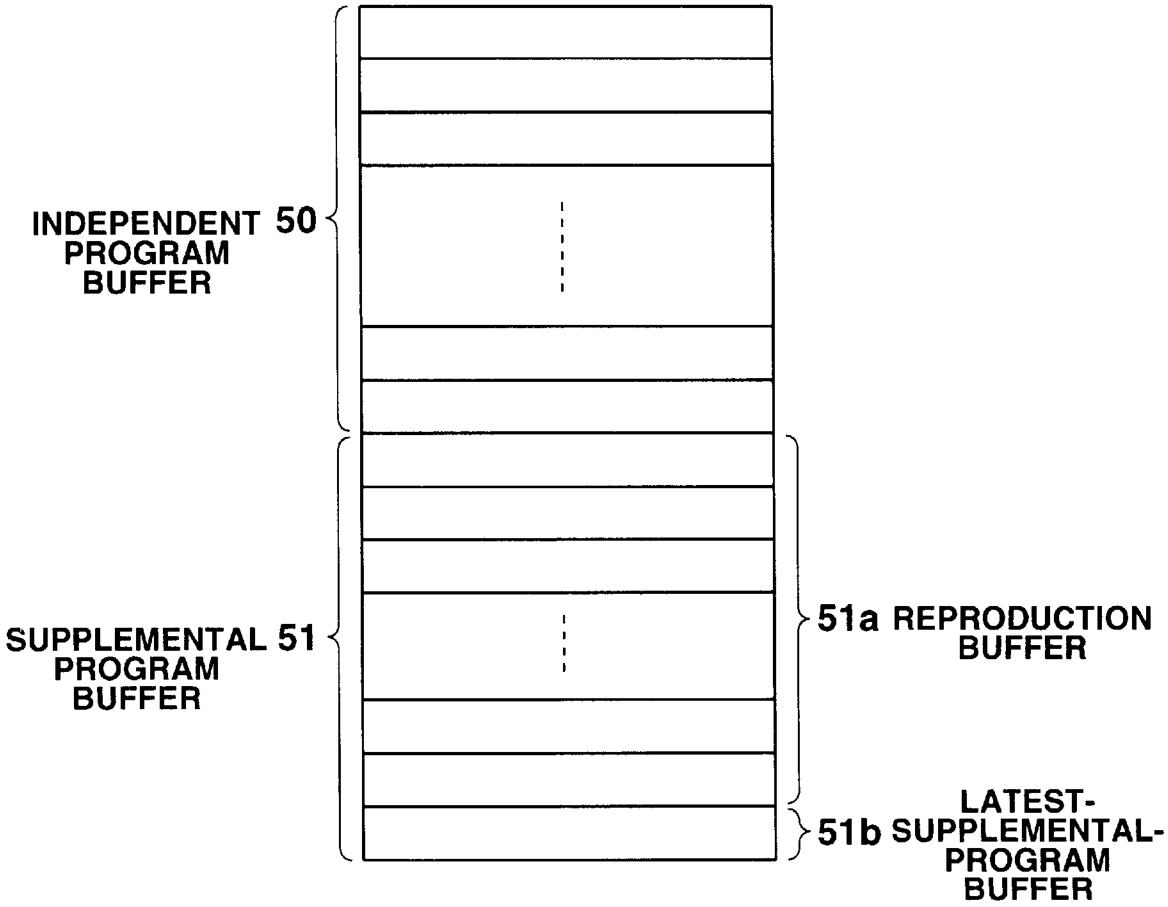
FIG. 4 is a view showing an internal structure of a received data memory.

The received data memory 35 is provided with a buffer 50 (independent program buffer) for the independent program and a buffer 51 (supplemental program buffer) for the supplemental program, as shown in FIG. 4. The independent program buffer 50 has plural memory areas for storing the contents of the independent program (character data) and the supplemental program buffer 51 has a buffer 51*a* (reproduction buffer) specialized in reproduction and a buffer 51*b* (latest-supplemental-program buffer) specialized in a latest supplemental program. The reproduction buffer 51*a* is provided with plural memory areas for storing a predetermined number of supplemental program information items from the last received information in a mode other than the reproduction mode. The supplemental program information items which are successively received are successively written over the supplemental program information previously written in the latest-supplemental-program buffer 51*b* in the reproduction mode.

In the FM multiplex broadcasting receiver 1 having the above mentioned structure, when the power is turned on, the control unit 33 starts processing operations in accordance with the process program stored in the ROM 34. A program information receiving process of the control unit 33 is executed in accordance with a flowchart of FIG. 5. At step SA1 of FIG. 5, the control unit 33 judges based on the received program number whether an information following to the received program number is a supplemental program information. When it is determined at step SA1 that the information following to the program number is not a supplemental program information but an independent program information, it is judged at step SA2 whether the information following to the program number is an independent program previously selected to be displayed by operation of the Right key 13*d* and the OK key 12.

When it is determined that the information following to the program number is the independent program selected to be displayed , the received independent program information, i.e., the latest information, is stored in the independent program buffer 50 at step SA3. In the case that there is left an empty memory area in the independent program buffer 50, the received independent program information is stored therein. In the case that all the memory areas in the independent program buffer 50 are occupied by independent program information items and there is left no empty memory area therein, the oldest information among the independent program informations stored in the independent program buffer 50 is removed from the memory area of the buffer 50 and remaining information items are successively moved or shifted to next memory areas to allow the received independent program information to be stored in the memory area which is made empty for storing an information. The independent program information, i.e., the latest information, which has been stored last in the independent program buffer 50 in the above manner, is displayed on the display unit 3 at step SA4.

When it is determined at step SA2 that the information following to the program number is not the independent program selected to be displayed, the received independent program information is not stored in the independent program buffer 50, and the program information receiving process is finished.

When it is determined at step SA1 that the received program information is a supplemental program information, it is judged at step SA5 whether the reproduction mode has been set. When it is determined at step SA5 that the reproduction mode has not been set, the received supplemental program information is stored in the reproduction buffer 51*a* of the supplemental program buffer 51 at step SA6, regardless of selection of the supplemental program for displaying. Similarly, in the case that there is left an empty memory area in the reproduction buffer 51*a* of the supplemental program buffer 51, the received supplemental program information is stored therein. In the case that all the memory areas in the reproduction buffer 51*a* are occupied by the supplemental program information items and there is left no empty memory area therein, the oldest information among the supplemental program information items stored in the reproduction buffer 51*a* is removed from the memory area thereof and remaining information items are successively moved or shifted to next memory. Then, the received supplemental program information is stored in the empty memory area of the reproduction buffer 51*a*. At step SA6, seven supplemental program information items are stored in the reproduction buffer 51*a* from the latest to the oldest in the order of receipt.

Then, the operation goes to step SA7, where it is judged whether a supplemental program is previously selected to be displayed by operation of the Right key 13*d* and the OK key 12. When it is determined at step SA7 that a supplemental program information is selected and displayed, the latest supplemental program information which has been stored in the reproduction buffer 51*a* at step SA6 is displayed on the display unit 3 at step SA8. When it is determined at step SA7 that no supplemental program information is selected to be displayed, the latest supplemental program information stored at step SA6 in the reproduction buffer 51*a* is not displayed on the display unit 3 and the program information receiving process is finished.

When it is determined at step SA5 that the reproduction mode has been set, the received supplemental program information is stored in the latest-supplemental-program buffer 51*b* of the supplemental program buffer 51 at step SA9. The received supplemental program information is written over the information previously stored in the latest-supplemental-program buffer 51*b*. As a result, the latest supplemental program information will be stored at step SA9, allowing display of same after the reproduction mode is released, which information is received even while the reproduction mode has been set and a supplemental program information is read out and displayed, as will be described later.

Figure 5:
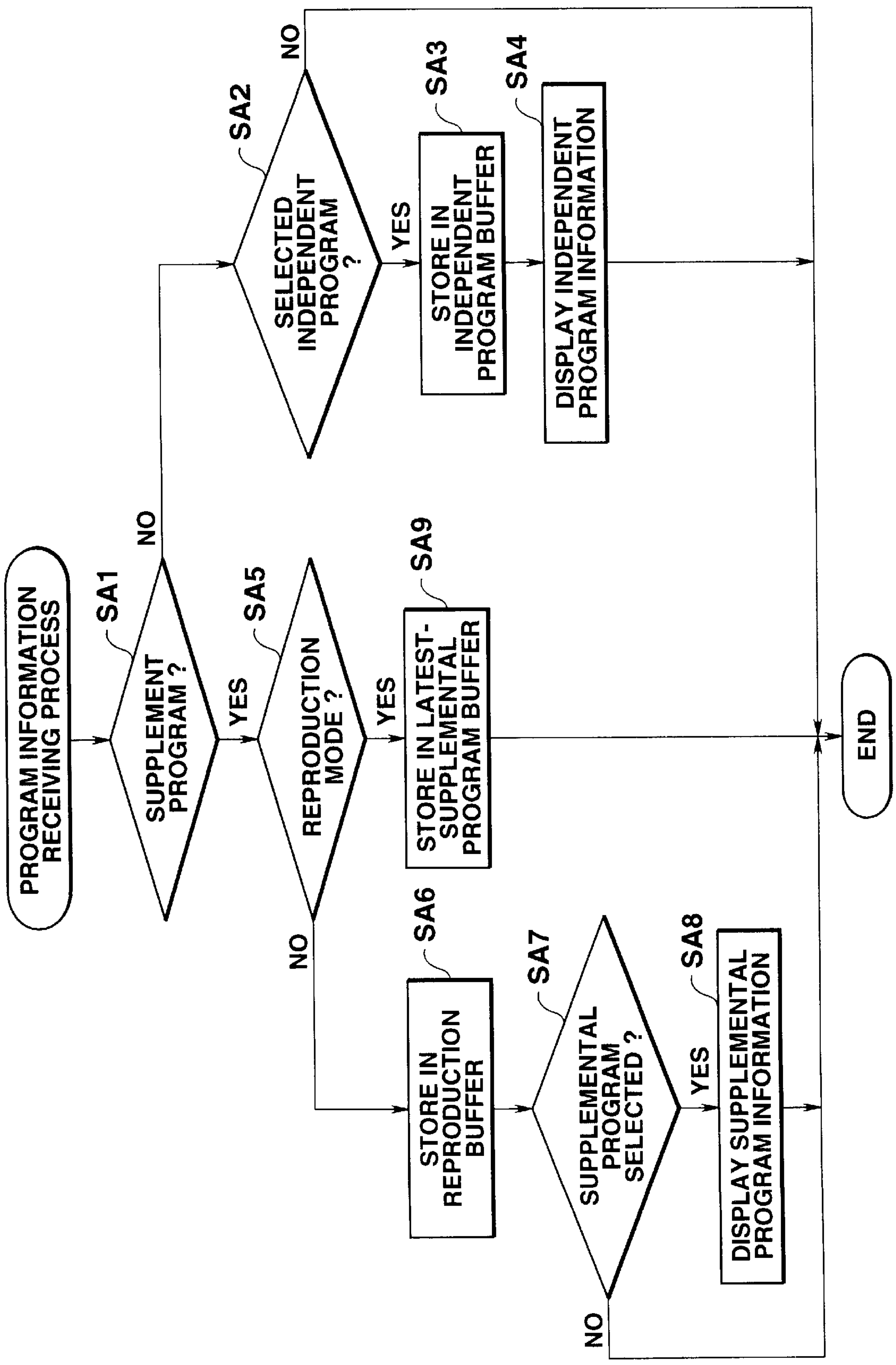
FIG. 5 is a flowchart of a program information receiving process.

In the flowchart of FIG. 5, the supplemental program informations are allowed to be successively stored in the reproduction buffer 51*a*, when the reproduction mode has not been set. The receiver may be arranged such that an information is allowed to be stored in the reproduction buffer 51*a* only when it is determined that the same information has not been previously stored in the reproduction buffer 51*a*. With this arrangement, the same information items are prevented from being stored in the reproduction buffer 51*a*, thereby the memory area of the reproduction buffer 51*a* will not be occupied in vain and may be used effectively.

FIG. 6 is a view showing transitive indications of supplemental program information selected to be displayed on the display unit 3. When the power is turned on, a main menu, i.e., available data are displayed with letters together with the cursor C on the display unit 3, as shown at A1 in FIG. 6, by operation of the data menu key 11. On the display unit 3 are indicated only two programs, because the display unit 3 has the display space for displaying only two lines, as described before. But other data can be scrolled to be displayed on the display unit 3 by operation of the Up or Down keys 13*a* and 13*b*.

When a user selects his (or her) desired program on the display unit 3 with the cursor C, and operates the Right key 13*d* and the OK key 12, then an indication of "Just a moment, please." appears on the display unit 3 as shown at A2 in FIG. 6, and a receipt indication starts, which corresponds to the program selected to be indicated. The indications of the supplemental program information, which has been selected by operation of the Right key 13*d* and the OK key 12, are shown in FIG. 6.

When a supplemental program is selected to be indicated, supplemental program information items are successively indicated on the display unit 3 as shown at A3 to A9 in FIG. 6, which information items relate to an FM broadcasting voice program which is audibly being outputted from the speakers 26*a*, 26*b* of the FM broadcasting receiving unit 20. Therefore, the user can read the supplemental program information items displayed on the display unit 3, such as a sponsor of the program (A3), the title of a music (A5) and so on, while he (she) is listening to the FM broadcasting program outputted through the speakers 26*a*, 26*b*.

When an independent program such as the traffic information and the weather forecast program is selected to be indicated, the independent program is indicated on the display unit 3 every time the same is received. Therefore, when an independent program is selected, the user can read the independent program displayed on the display unit 3 which is independent from the voice program which he (she) is now listening to.

Figure 7:
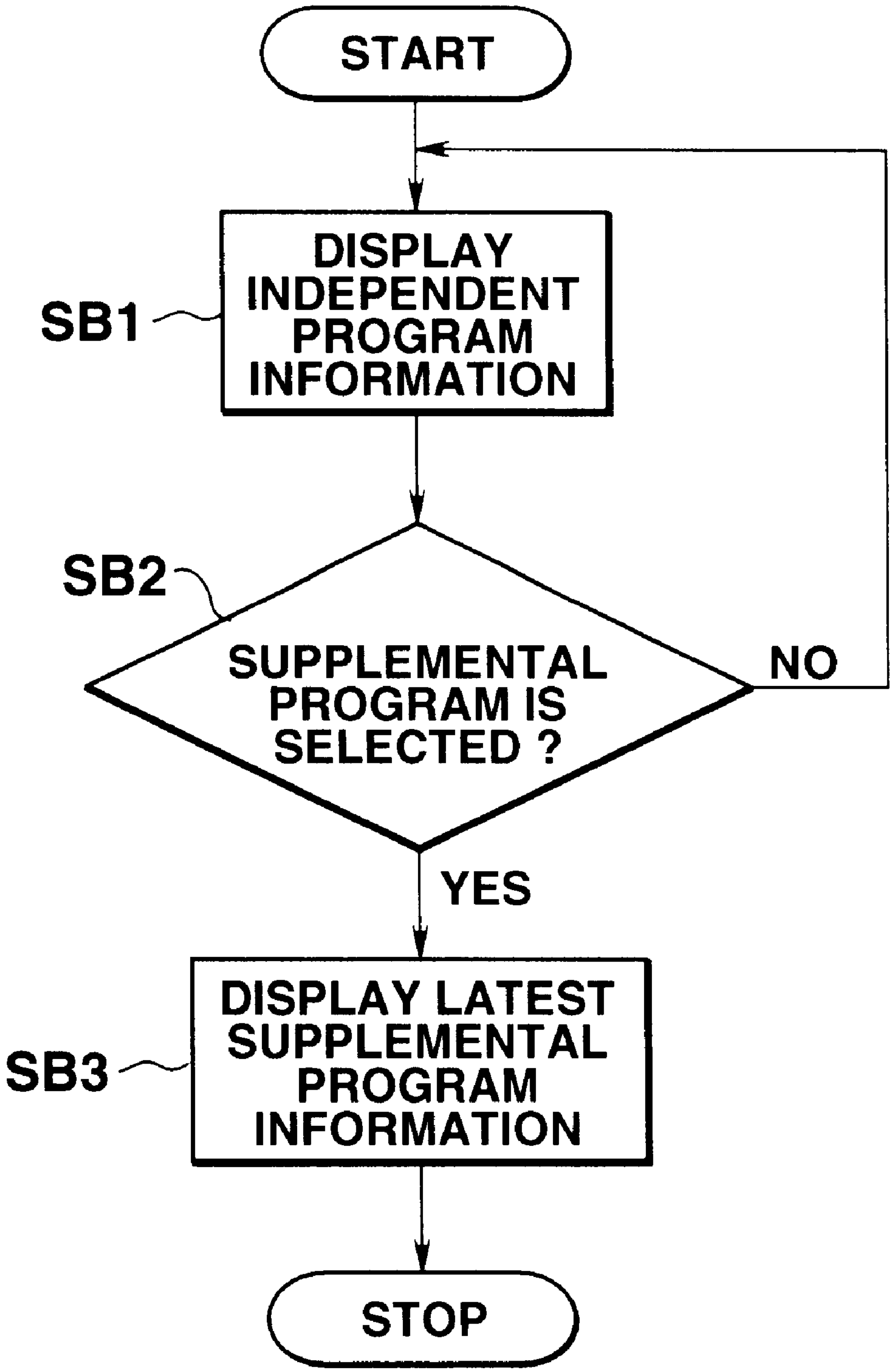
FIG. 7 is a flowchart of a display switching process.

FIG. 7 is a flowchart of a process which is executed by the control unit 33 to indicate information relating to an audio or voice program to which the user is listening while information such as a traffic information is indicated, which information is independent from the voice program.

The data menu key 11 is operated to indicate the menu indication (A1 of FIG. 6), while independent program information is indicated on the display unit 3 at step SB1 of FIG. 7. Then, the cursor C is moved onto the "Supplemental Program Information" indicated on the display unit 3, and the Right key 13*d* and the OK key 12 are operated at step SB2 to read out the latest information stored in the reproduction buffer 51*a*. Then, the read out information is displayed on the display unit 3 at step SB3. Therefore, the user can read instantly the latest supplemental program information indicated on the display unit 3, which information relates to the voice program that the user is now listening to.

Figure 8:
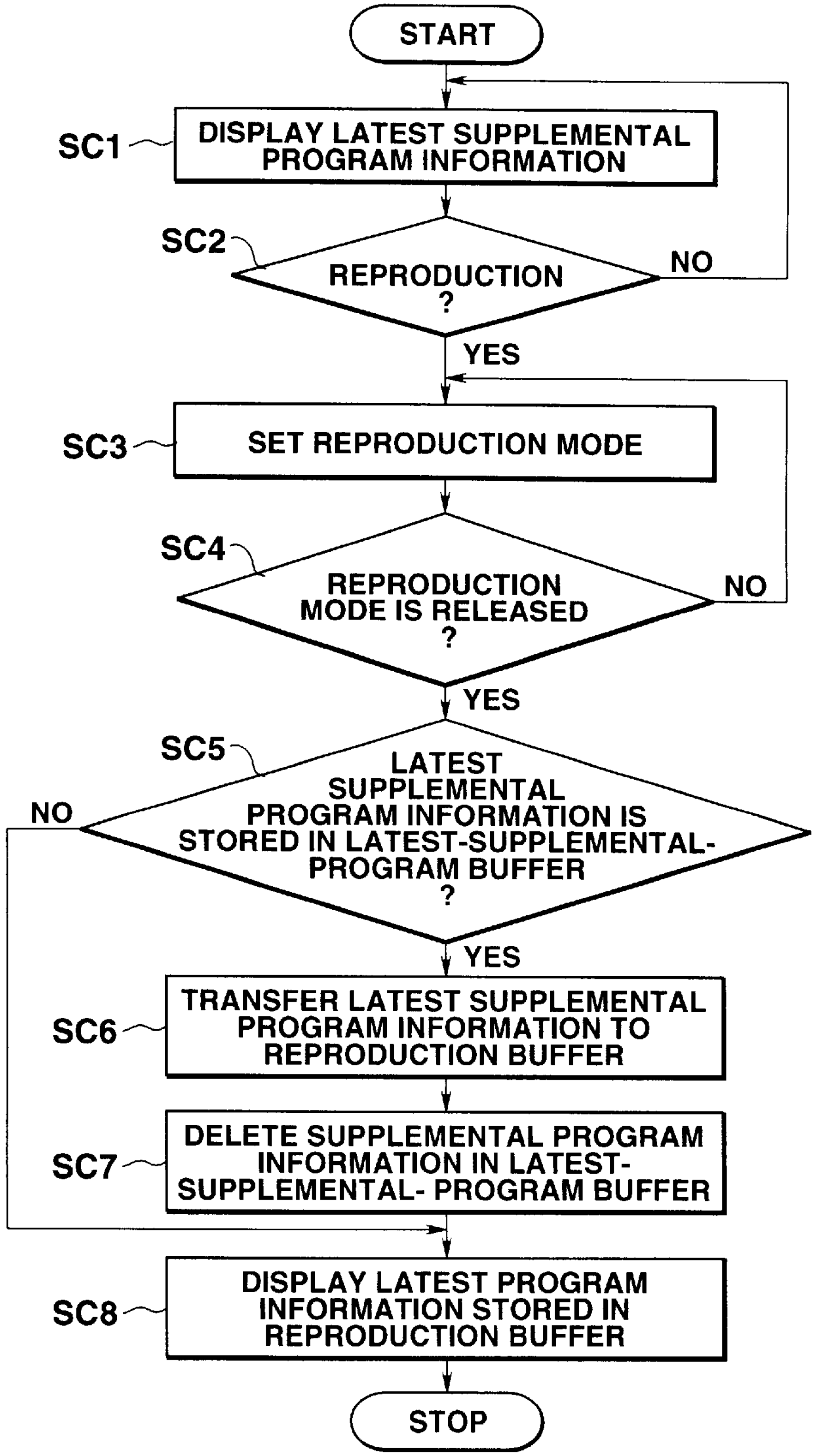
FIG. 8 is a flowchart of processes to be executed in a reproduction mode.
Figure 9:
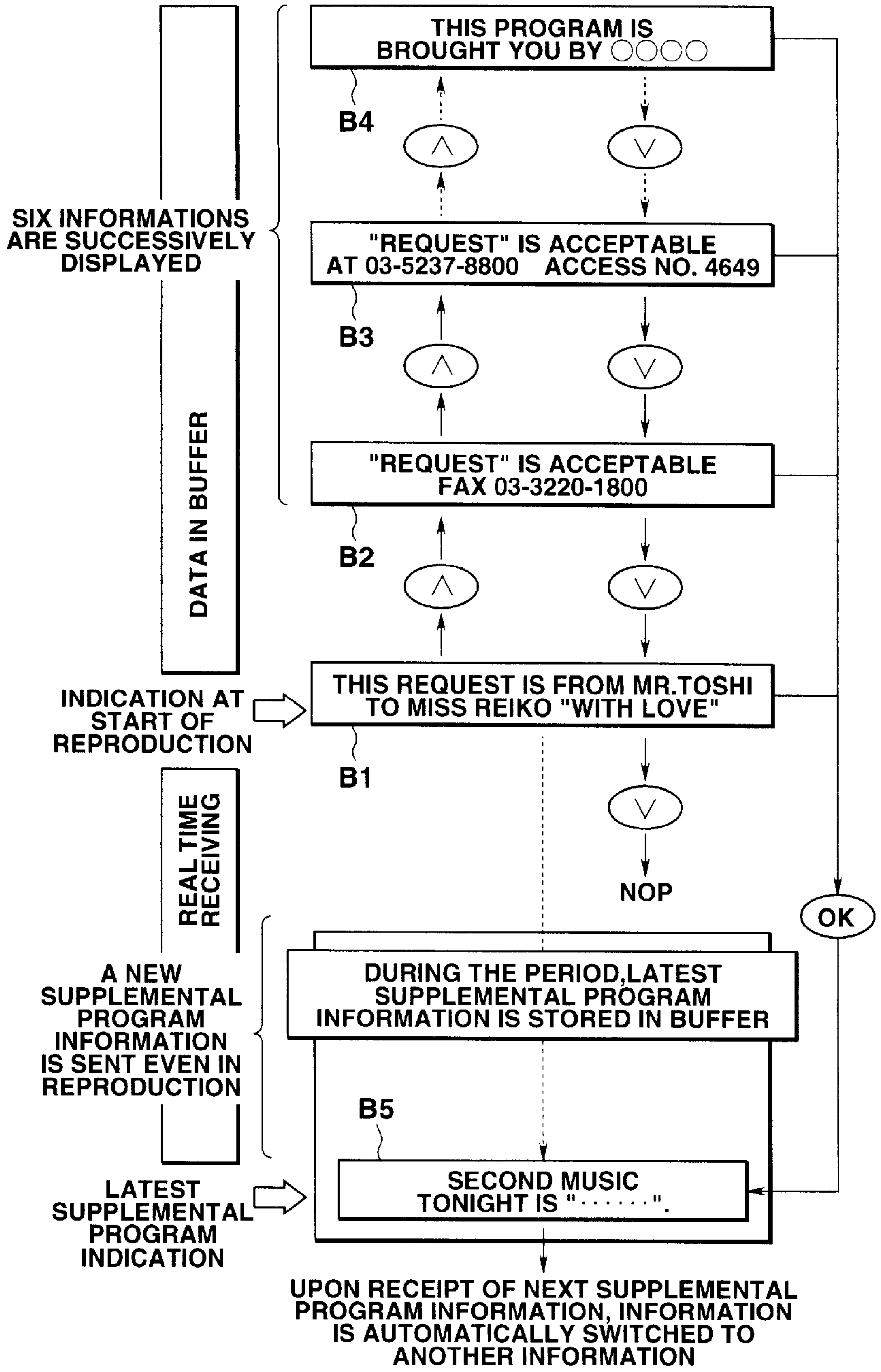
FIG. 9 is a view showing transitive displays displayed on the display unit.

FIG. 8 is a flowchart of processes that the control unit 33 executes to display the supplemental program information previously stored in the reproduction buffer 51*a*. When the Up key 13*a* is operated for a reproduction operation at step SC2 of FIG. 8 while the latest supplemental program information stored in the reproduction buffer 51*a* is displayed on the display unit 3 at step SC1, then the reproduction mode is set, in which a new supplemental program information following to the latest program information is displayed at step SC3, as shown at B2 in FIG. 9. In the reproduction mode, supplemental program information items are successively displayed on the display unit 3 every operation of the UP key 13*a*. (Indications in the order of B2–B3–B4 in FIG. 9.) More specifically, assuming that seven supplemental program information items are stored in the reproduction buffer 51*a*, the supplemental program information items from the latest to the sixth information can be successively displayed in the order of storage of the information items by operation of the Up key 13*a*.

When the Up key 13*a* is operated while the oldest supplemental program information is on the display unit 3, information is not scrolled on the display unit 3 and the oldest information is kept displayed thereon. When the Down key 13*b* is operated, then the second oldest supplemental program information is displayed.

More specifically, when the Down key 13*b* is operated while information other than the information of B1 is displayed on the display unit 3 in the reproduction mode, the supplemental program information items are successively read and displayed on the display unit 3 in the reverse order of storage of information. (Indications in the order of B4–B3–B2–B1.) As described above, any desired information can be displayed on the display unit 3 by operation of the Up and Down key 13*a*, 13*b*.

At step SC4, it is judged whether the reproduction mode is released. The reproduction mode is released under anyone of the following conditions:

(1) Operation of the OK key 12 at an arbitrary time;

(2) Operation of the Down key 13*b* while the indication of B1 is displayed on the display unit 3 in the reproduction mode;

(3) Neither of the Up key 13*a* nor the Down key 13*b* is operated in a period of 30 seconds. (Operation of the Left and Right key 13*c*, 13*d* is ignored.)

Therefore, the latest supplemental program information is written on the information previously stored in the latest-supplemental-program buffer 51*b* every time same is received, at step SA9 of FIG. 5, until the reproduction mode is released.

When the reproduction mode is released, it is judged at step SC5 of FIG. 8 whether any supplemental program information has been stored in the latest-supplemental-program buffer 51*b*. In other words, it is judged whether the latest supplemental program information is received in the reproduction mode of step SC3. When a supplemental program information that is received in the reproduction mode is stored in the latest-supplemental-program buffer 51*b*, the latest supplemental program information stored in the latest-supplemental-program buffer 51*b* is transferred to the reproduction buffer 51*a* at step SC6, and the supplemental program information stored in the latest-supplemental-program buffer 51*b* is deleted at step SC7. The latest supplemental program information is read out from the reproduction buffer 51*a* and displayed on the display unit 3 at step SC8, as shown at B5 in FIG. 9. As a result, even after the reproduction mode has been released, the user can instantly read the supplemental program information relating to the audio program, which supplemental program information was received in the reproduction mode. When the reproduction mode has been released at step SC4, and it is determined at step SC5 that no latest supplemental program information has been stored in the latest-supplemental-program buffer 51*b*, the processes at steps SC6 and SC7 are skipped, and the latest supplemental program information stored in the reproduction buffer 51*a* is read out therefrom and displayed on the display unit 3 at step SC8.

As described above, the supplemental program information received in the reproduction mode is not stored in the reproduction buffer 51*a* but is stored in the latest-supplemental-program buffer 51*b*. Therefore, the contents stored in the reproduction buffer 51*a* will not be changed in the reproduction mode. The user can read the supplemental program information stored at the start of the reproduction mode. For example, the user can obtain information, such as a title, concerning a tune that is on air, which information will have been announced before broadcasting of the tune.

In the present embodiment of the FM multiplex broadcasting receiver, only one supplemental program information is stored in the latest-supplemental-program buffer, but the receiver can be arranged such that a plurality supplemental program information items are stored the latest-supplemental-program buffer. With this arrangement, the user can read plural supplemental program information items received in the reproduction mode.

A specific embodiment of the FM multiplex broadcasting receiver of the present invention has been described hereinabove, but the present invention can be employed in a wide variety of appliances that send audio information as well as display information relating to the audio information.

What is claimed is:

1. A frequency modulated multiplex broadcasting wave receiver for receiving a frequency modulated multiplex broadcasting wave carrying audible information and visual information multiplexed thereon, said frequency modulated multiplex broadcasting wave receiver comprising:

a receiving unit for detecting the audible information and successive supplemental visual information items contained in the visual information of the received frequency modulated multiplex broadcasting wave, said supplemental visual information items relating to the audible information;

an output device for audibly outputting the audible information detected by said receiving unit;

a display;

a memory for storing a plurality of the supplemental visual information items detected by said receiving unit;

first display control means for controlling said display to display in a sequentially switching manner the successive supplemental visual information items detected by said receiving unit;

first memory control means for controlling said memory to sequentially store the successive supplemental visual information items which said first display control means has controlled said display to display in the sequentially switching manner;

a display instructing means for instructing said display to display at least one of the plurality of supplemental visual information items stored in said memory;

second display control means, responsive to an operation of said display instructing means, for controlling said display to display the at least one of the plurality of supplemental visual information items stored in said memory;

third display control means, responsive to said receiving unit detecting a new supplemental visual information item at a time when said second display control means has controlled said display to display the at least one of the plurality of supplemental visual information items stored in said memory, for inhibiting said first display control means from controlling said display to display the new supplemental visual information item detected by said receiving unit; and second memory control means, also responsive to said receiving unit detecting the new supplemental visual information item at the time when said second display control means has controlled said display to display the at least one of the plurality of supplemental visual information items stored in said memory, for controlling said memory to store the new supplemental visual information item detected by said receiving unit.

2. A frequency modulated multiplex broadcasting wave receiver as claimed in claim 1, wherein:

said memory comprises a first submemory and a second submemory;

said first submemory stores the plurality of supplemental visual information items detected by said receiving unit;

said first memory control means controls said first submemory to sequentially store the successive supplemental visual information items which said first display control means has controlled said display to display in the sequentially switching manner;

said display instructing means instructs said display to display at least one of the plurality of supplemental visual information items stored in said first submemory;

said second display control means controls said display to display the at least one of the plurality of supplemental visual information items stored in said first submemory responsive to the operation of said display instructing means;

said third display control means inhibits, when said receiving unit detects the new supplemental visual information item at the time when said second display control means has controlled said display to display the at least one of the plurality of supplemental visual information items stored in said first submemory, said first display control means from controlling said display to display the new supplemental visual information item detected by said receiving unit; and said second memory control means controls said second submemory to store the new supplemental visual information item detected by said receiving unit when said second display control means has controlled said display to display the at least one of the plurality of supplemental visual information items stored in said first submemory.

3. A frequency modulated multiplex broadcasting wave receiver for receiving a frequency modulated multiplex broadcasting wave carrying audible information and visual information multiplexed thereon, said frequency modulated multiplex broadcasting wave receiver comprising:

a receiving unit for detecting the audible information as well as successive supplemental visual information items and an independent visual information item contained in the visual information of the received frequency modulated multiplex broadcasting wave, said supplemental visual information relating to the audible information and said independent visual information item being unrelated to the audible information;

an output device for audibly outputting the audible information detected by said receiving unit;

a display;

a first memory for storing the supplemental visual information item detected by said receiving unit;

first display control means for controlling said display to display in a sequentially switching manner the successive supplemental visual information items detected by said receiving unit;

a first display instructing means for instructing said display to display the independent visual information item;

second display control means, responsive to an operation of said first display instructing means, for controlling said display to display the independent visual information item detected by said receiving unit;

third display control means, responsive to said receiving unit detecting a new supplemental visual information item at a time when said second display control means has controlled said display to display the independent visual information item, for inhibiting said first display control means from controlling said display to display the new supplemental visual information item detected by said receiving unit;

a memory control means, also responsive to said receiving unit detecting the new supplemental visual information at the time when said second display control means has controlled said display to display the independent visual information item, controlling said first memory to store the new supplemental visual information item detected by said receiving unit;

second display instructing means for instructing said display to display the supplemental visual information item stored in said first memory; and fourth display control means for controlling said display to display the supplemental visual information item stored in said first memory when said second display instructing means instructs said display to display the supplemental visual information item.

4. A frequency modulated multiplex broadcasting wave receiver as claimed in claim 2, further comprising:

instruction releasing means for releasing said display from an instruction given by said display instructing means to display the at least one supplemental visual information items; and wherein said second memory control means further comprises means for, when a supplemental visual information item has been stored in said second submemory at a time when said instruction releasing means releases said display from the instruction to display the at least one supplemental visual information item, controlling said first submemory to store the supplemental visual information item stored in said second submemory and to erase the supplemental visual information item from the second submemory.

5. A frequency modulated multiplex broadcasting wave receiver as claimed in claim 2, further comprising:

instruction releasing means for releasing said display from an instruction given by said display instructing means to display the at least one supplemental visual information item; and fourth display control means for, when a supplemental visual information item has been stored in said second submemory at a time when said instruction releasing means releases said display from the instruction to display the at least one supplemental visual information item, controlling said display to display the supplemental visual information item stored in said second submemory.

6. A frequency modulated multiplex broadcasting wave receiver as claimed in claim 3, wherein:

said second display control means further comprises means for, when the independent visual information item is detected by said receiving unit and said first display instructing means has instructed said display to display the independent visual information item, controlling said display to display said independent visual information item detected by said receiving unit.

7. A frequency modulated multiplex broadcasting wave receiver as claimed in claim 3, further comprising:

a second memory for storing the independent visual information item detected by said receiving unit; and wherein said memory control means further comprises means for, when the independent visual information item is detected by said receiving unit and said first display instructing means has instructed said display to display the independent visual information item, controlling said second memory to store said independent visual information item detected by said receiving unit.

8. A frequency modulated multiplex broadcasting wave receiver as claimed in claim 2, wherein said first memory control means further comprises:

judging means for determining whether one of a plurality of memory areas in said first submemory is free; and storing means for deleting an oldest supplemental visual information item most previously stored in said first submemory when said receiving unit detects the new supplemental visual information item and said judging means has determined that there is no free memory area in said first submemory, and for storing in said first submemory the new supplemental visual information item detected by said receiving unit in place of the deleted most previously stored oldest supplemental visual information item.

9. A frequency modulated multiplex broadcasting wave receiver as claimed in claim 2, wherein:

said second submemory comprises one memory area for storing one supplemental visual information item detected by said receiving unit; and said second memory control means successively replaces the one supplemental visual information item stored in said second submemory with the new supplemental visual information item detected by said receiving unit each time the receiving unit detects successive new supplemental visual information items.

10. A frequency modulated multiplex broadcasting wave receiver as claimed in claim 7, wherein:

said second memory stores a plurality of independent visual information items detected by said receiver.

* * * * *